Schafer et al.

[11] 3,735,278
[45] May 22, 1973

[54] DEVICE FOR WAVELENGTH SELECTION IN LASERS WITH BROAD-BAND EMISSION

[75] Inventors: Fritz Peter Schafer, Marburg; Werner Schmidt, Aalen, both of Germany

[73] Assignee: Carl Zeiss-Stiftung, Heidenheim (Brenz) Wuerttemberg, Germany

[22] Filed: Oct. 12, 1971

[21] Appl. No.: 188,073

[30] Foreign Application Priority Data

Oct. 20, 1970   Germany.....................P 20 51 328.4

[52] U.S. Cl..................................................331/94.5
[51] Int. Cl...................................................H01s 3/10
[58] Field of Search.......................................331/94.5

[56] References Cited

UNITED STATES PATENTS 3,443,243   5/1969   Patel....................331/94.5

Primary Examiner—William L. Sikes
Attorney—Hill, Sherman, Meroni, Gross & Simpson and Harry Mansen

[57] ABSTRACT

In a device for wavelength selection in dye lasers with a broad-band emission, and which comprises in axial alignment a light source, a laser cell, a directional filter including an apertured stop, the improvement comprises a focusing lens system having a wavelength-dependent focal length arranged behind said directional filter and which with the assistance of a mirror images said apertured stop in itself by reflection.

5 Claims, 3 Drawing Figures

INVENTORS
Fritz Peter Schäfer, Werner Schmidt
BY Hans W. Hafter
ATTORNEY

DEVICE FOR WAVELENGTH SELECTION IN LASERS WITH BROAD-BAND EMISSION

This invention relates to a device for the wavelength selection in lasers with broad-band emission, in particular to dye lasers.

The organic dye families showing a laser effect have strong and broad absorption and fluorescence bands. Also their laser emission extends over a broad wavelength range. However, the emission band can be restricted to a narrow line when using a resonator of spectrally selective quality. With a suitable design the selected line can be shifted over a range of several 100 nm.

By way of example, it is prior art in the laser assembly to provide a reflection diffraction grating in Littrow setup in place of a resonator mirror. In this arrangement, only a narrow wavelength range dependent on the position of the grating, of the light leaving the laser cell and impinging upon the grating is diffracted back in itself, whereas light of other wavelengths is diffracted back at an angle relative to the resonator axis and is not intensified any further. A portion of the laser light leaves the resonator as a useful output beam in a direction of zeroth diffraction order of the grating. The emission wavelength can be changed by inclining the grating about an axis parallel to its groove. The disadvantage is, however, that also the output beam changes its direction. Another disadvantage resides in the divergence of the laser beam. That is to say, in order to produce narrow emission lines with arrangements of the described example in which dispersing elements with angular dispersion are used, the divergence of the laser beam in the resonator should be as small as possible. In dye lasers, however, divergences of many m rad can occur. The portion of the pumping light absorbed by the solvent as heat energy causes changes in the refractive index for the duration of pumping in the solution, so that the laser material becomes optically inhomogeneous. Depending on the concentration of the active solution and on the pumping light distribution in the solution dependent on the geometry of the pumping device, a positive or negative lens effect or a prism effect is produced in the resonator. Thus, during the pulse the entering angle of the light into the dispersing element does not remain constant in space and in time which produces a great emission band width. It exceeds by a multiple the band width which would be caused by the element in case of diffraction-limited divergence.

The disadvantage of great divergence may be avoided when expanding the laser light beam prior to its admission into the selector with a telescope system. As a directional filter an apertured stop can additionally be incorporated in the focus of the ray-expanding system.

It is an object of this invention to provide a directional filtering and wavelength selection with a particularly simple device which is furthermore free of the disadvantage that the output light beam changes its direction if the laser wavelength is fully tuned by means of the selector.

According to the invention, this object is solved by providing a focusing element with wavelength-dependent focal length in the optical path of rays behind a directional filter, which images the apertured stop in itself by reflection.

In an advantageous embodiment of the invention the focusing element comprises a lens system of great chromatic longitudinal deviation and of small spherical aberration which is succeeded by an autocollimating mirror.

In an example of the invention the focal length of the lens system for wavelengths between $\lambda = 405$ nm and $\lambda = 660$ nm varies between 50 and 120 nm.

In another advantageous embodiment of the invention the focusing element comprises a reflection diffraction grating with blaze effect and a wavelength-dependent focal length which, for instance, can be made in known and simple manner interferometrically-holographically and is termed hereinafter Fresnel zone mirror.

For increasing the spectral resolution the light beam is advantageously caused to impinge upon the focusing element outwardly of the optical axis.

The advantages of the device of the invention reside particularly in its simple assembly and in the directional constancy of the beam uncoupled from the resonator by a zone mirror with a change in the wavelength adjustment as the selector is only slidably moved and parallel to the optical axis.

A few illustrative embodiments of this invention are illustrated in the FIGS. 1 to 3 of the accompanying drawing and will now be explained more fully:

In the drawing

Figure 1:
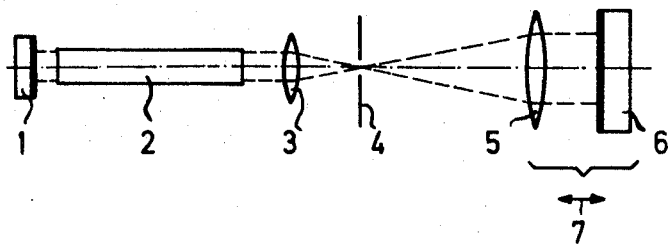
FIG. 1 is the schematic illustration of a device according to the invention, in which the element focusing with wavelength-dependent focal length comprises a lens system which is succeeded by an autocollimating mirror.

Referring now to the figures of the accompanying drawing, reference numeral 1 designates a pumping light source for the dye laser, reference numeral 2 the laser cell and reference numerals 3 and 4 a directional filter with ray-expanding effect, of which 3 indicates a collecting lens and 4 an apertured stop.

In the arrangement of the invention illustrated in FIG. 1 reference numeral 5 designates a chromatic lens system with wavelength-dependent focal length and reference numeral 6 designates an autocollimating mirror arranged in axial direction behind the lens system 5. The group 5, 6 which images the stop 4 onto itself in the light of the desired wavelength, in this embodiment is adapted to be slidably shifted for full tuning and restriction of the emission band along the optical axis in a direction of the double arrow 7.

Figure 2:
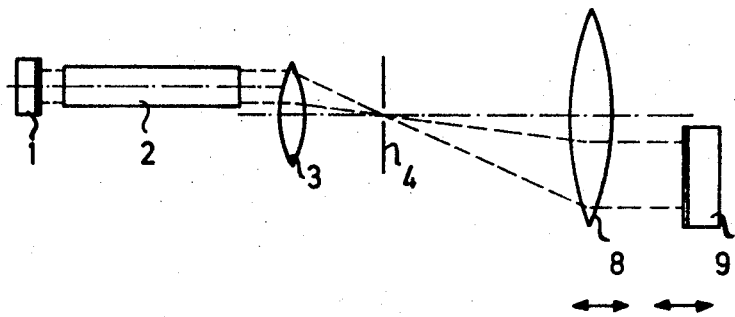
FIG. 2 illustrates a device according to the invention corresponding to FIG. 1, in which the light beam impinges upon the focusing lens system outwardly of the optical axis.

In the arrangement of the invention illustrated in FIG. 2 for increasing the spectral resolution the light beam is directed onto the focusing lens system 8 and the associated mirror 9 outwardly of the optical axis.

Figure 3:
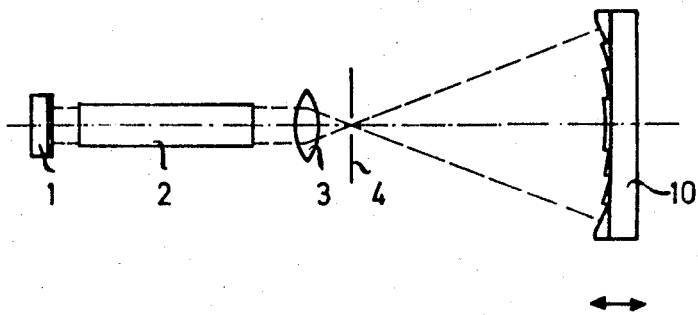
FIG. 3 is a schematic illustration of a device according to the invention, in which the element focusing with wavelength-dependent focal length comprises a Fresnel zone mirror made interferometrically-holographically.

FIG. 3 illustrates a device according to the invention in which the element focusing with a wavelength-dependent focal width comprises an interferometrically-holographically made Fresnel zone mirror 10. Also in this arrangement the light beam can be directed outwardly of the optical axis to increase the spectral resolution. When air forms the ambient medium this Fresnel zone mirror is used for wavelengths of about $\lambda = \lambda_o/n$. In this equation $\lambda_o$ designates the wavelength of the light used for producing the hologram designed as a Fresnel zone plate, n designates the refractive index of the glass used for the zone mirror and of the photo-varnish in which the hologram was produced. When cementing the zone mirror with glass, it can be used for wavelengths of about $\lambda_o$. The emission band of the laser is also fully tuned and restricted in the arrangement corresponding to FIG. 3 by slidably shifting the zone mirror 10 along the optical axis as indicated by the double arrow 11, as its focal length f is a function of the wavelength $\lambda_o$ producing the hologram and of the wavelength $\lambda$ impinging upon the mirror from the laser which is expressed mathematically as follows:

$$f(\lambda) = (\lambda_o/\lambda) \cdot f(\lambda_o)$$

What we claim is:

1. A device for continuous wavelength selection in lasers with broad-band emission, particularly dye lasers comprising a laser cell filled with a laser active medium capable of a broad wavelength range of emission, an optical resonator disposed about said active medium to resonate the radiation from said excited medium and to transmit portions of said resonated radiation, a first optical system in optical alignment with said optical resonator and in the path of radiation emitted from said resonator and forming a directional filter with an apertured stop, and a focusing second optical system with wavelength-dependent focal length arranged in the optical path of rays behind said directional filter and including a mirror for imaging said apertured stop in itself by reflection, said second optical system having great chromatic longitudinal deviation and small spherical abberation and being shiftable along its optical axis to image the apertured stop in itself for a selected wavelength.

2. A device according to claim 1, in which said mirror comprises an autocollimating mirror.

3. A device according to claim 1, in which said focusing element comprises a lens system whose focal length varies for different wavelengths between 50 and 120 mm for wavelengths between $\lambda = 405$ nm and $\lambda = 660$ nm.

4. A device according to claim 1, in which said focusing second optical system comprises an interferometrically-holographically made Fresnel zone mirror with a wavelength-dependent focal length.

5. A device according to claim 1, in which said laser cell and said optical systems have different optical axes.

* * * * *